F. P. BEVERLY AND C. CALDWELL.
CAR BRAKE.
APPLICATION FILED NOV. 17, 1920.

1,430,487.

Patented Sept. 26, 1922.
2 SHEETS—SHEET 1.

F. P. Beverly & C. Caldwell
INVENTORS

Witness

BY
Geo. F. Kimmel
ATTORNEY.

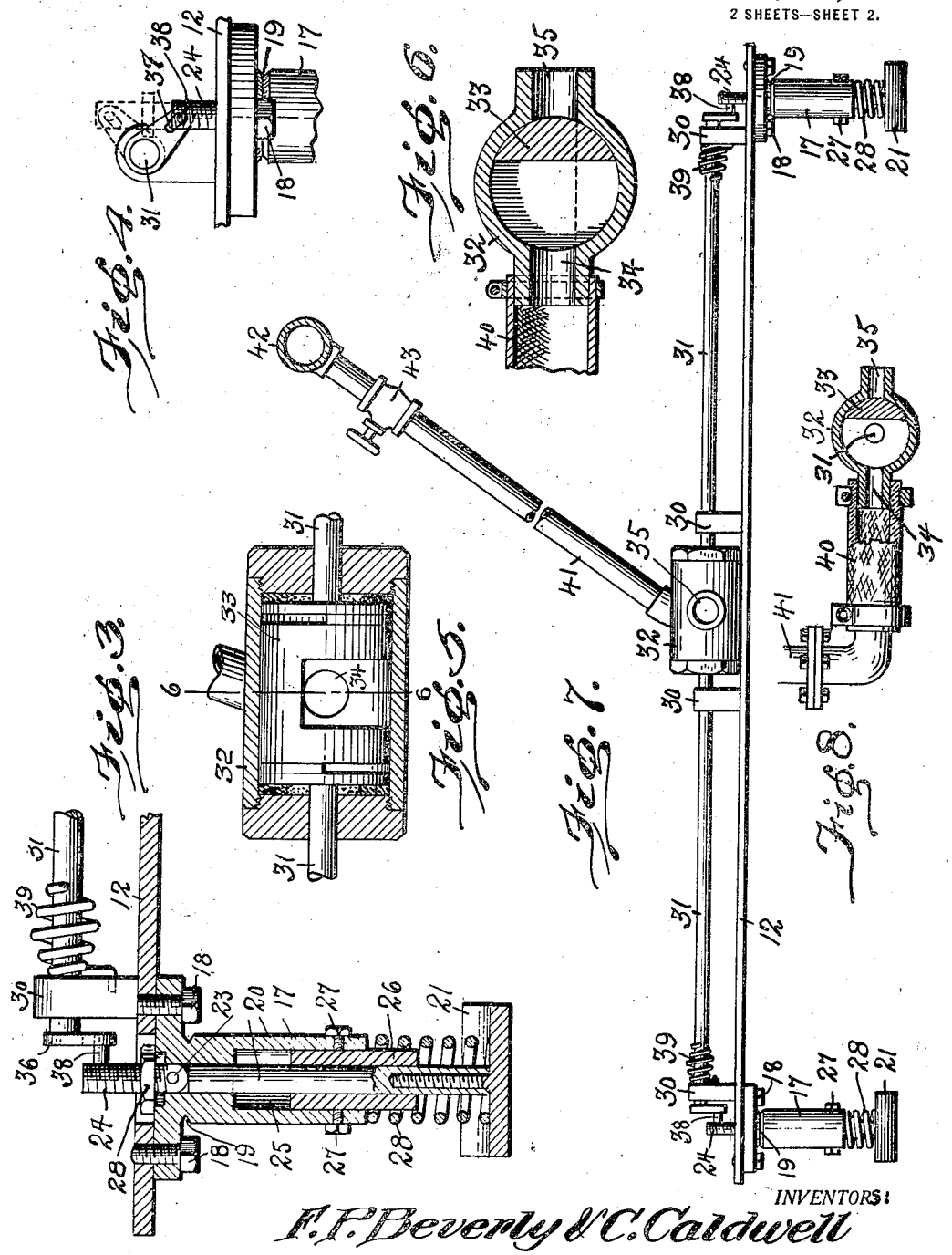

Patented Sept. 26, 1922.

1,430,487

UNITED STATES PATENT OFFICE.

FRED P. BEVERLY AND COMER CALDWELL, OF KAUFMAN, TEXAS.

CAR BRAKE.

Application filed November 17, 1920. Serial No. 424,710.

*To all whom it may concern:*

Be it known that we, FRED P. BEVERLY and COMER CALDWELL, citizens of the United States, residing at Kaufman, in the county of Kaufman and State of Texas, have invented certain new and useful Improvements in Car Brakes, of which the following is a specification.

This invention relates to compressed air controlled brakes for cars, and has for one of its objects to provide means whereby in the event of the derailment of one or more of the trucks, the air brakes of the remaining cars will be automatically set, together with the brakes of the derailed car.

Another object of this invention is to produce a device of this character adapted to be adjusted, without material structural change, to car trucks of various forms of construction.

With these and other objects in view, the invention consists in certain novel features of construction as hereinafter shown and described and specifically pointed out in the claims, and in the drawings illustrative of the preferred embodiment of the invention.

Fig. 3 is an enlarged sectional elevation of the brake applying portion of the apparatus.

Fig. 4 is a detail elevation of a part of the structure shown in Fig. 3.

Fig. 5 is a sectional detail of the valve, with the valve open.

Fig. 6 is a section on the line 6—6 of Fig. 5, with the valve closed.

Fig. 7 is a detail view illustrating the connection with the train pipe of the air brake system.

Fig. 8 is a view similar to Fig. 7, to illustrate the connection between the valve and the conductor to the train pipe.

Figure 1:
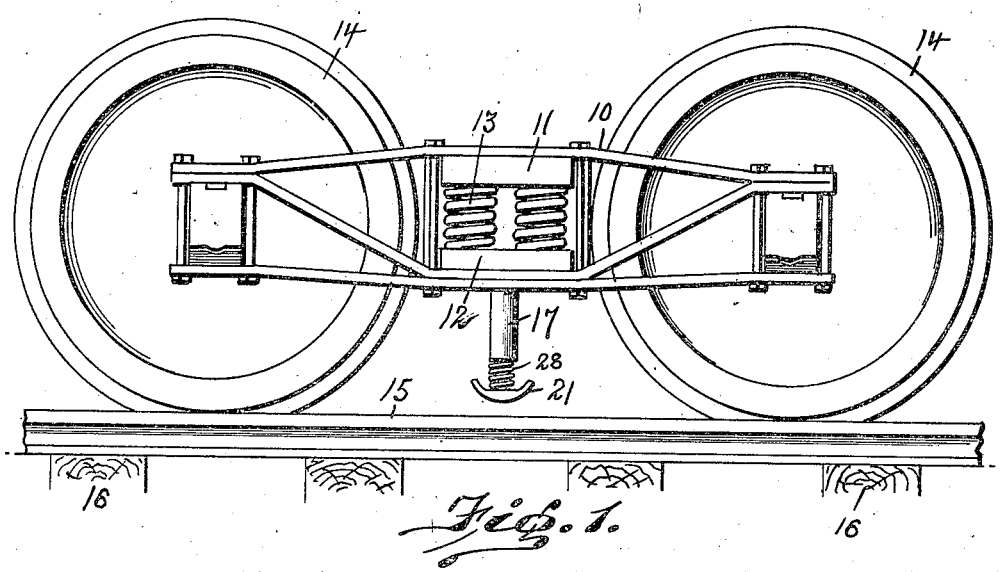
Figure 1 is a side elevation of a conventional car truck with the improved emergency brake device applied, the wheels of the truck being in position on the track and the emergency brake device in inoperative position.
Figure 2:
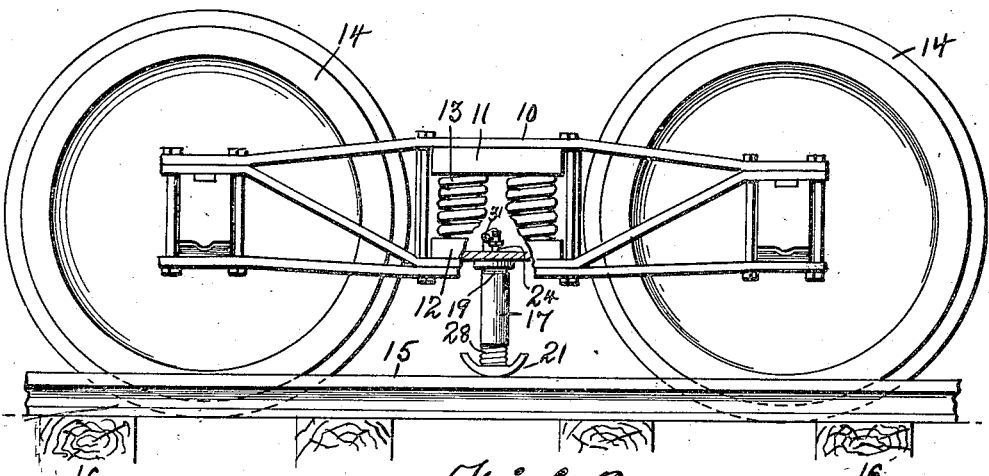
Fig. 2 is a view similar to that disclosed in Fig. 1 with the wheels derailed and the emergency brake device in operative position.

The improved device may be applied to any of the various makes of car trucks, but for the purpose of illustration is shown applied to a conventional construction of truck including side frames 10, bolster members 11, sand box or board 12, side springs 13 and wheels 14, the latter running upon the rails 15, supported upon ties 16.

The improved device includes tubular standards or hangers 17 rigidly secured by bolts or like fastening devices 18 near each end of the member 12 and substantially in alinement with the rails 15. Each standard is formed with an annular weakening groove 19 to cause the standard to break under abnormal strains, as hereafter explained.

Extending through each of the standards 17 is a relatively heavy stem 20, having a curved track engaging shoe 21 at the lower end, and jointed at 23 near the upper end to a threaded extension 24.

The bore of each of the standards 17 is counterbored as shown at 25, and disposed in each counterbore is a sleeve 26, each sleeve being adjustably supported by set screws 27, the sleeves operating to limit the upward movement of the shoes. Each threaded extension 24 is provided with an adjusting nut 28 bearing upon the upper end of the standard 17, as shown in Fig. 3.

Surrounding each sleeve and the lower portion of each stem 20 is a coiled spring 28, the springs bearing at their ends against the lower ends of the standards 17 and the shoes 21, and maintaining the latter yieldably in lower position.

Mounted in standards 30 upon the sand box member 12, or other suitable portion of the truck, are rock shafts 31, and supported between the confronting ends of the shafts is a valve casing 32 having a valve 33 therein and connected to the shafts. By this means the valve will be oscillated by the rocking of the shafts 31.

The valve casing 32 is provided with lateral passages 34 and 35, and the valve 33 is adapted to normally close the passage 35, as shown in Fig. 6 when the shafts 31 are in one position.

A crank arm 36 is connected to the outer end of each shaft 31 and slotted as shown at 37 to receive pins 38 extending from the threaded extensions 24.

By this arrangement when one or both of the shoes 21 are moved upwardly against the resistance of the springs 28, the shafts 31 will be oscillated and the valve 33 opened.

Each shaft 31 is provided with a spring 39 operating to maintain the shafts in one position, the spring of one shaft holding the same yieldably from movement in one direction, and the spring of the other shaft holding the same from movement in the other direction.

The lateral passage 24 is coupled by a flexible member 40 to a conductor 41, the latter in turn coupled to the train pipe of the air brake system of the train, a portion of the train pipe being indicated at 42.

The conductor 41 is provided with a controlling valve 43.

By this arrangement so long as the wheels remain on the track, the shoes 21 and the parts associated therewith remain inactive, and the air from the train pipe held back.

In event of the wheels of the truck at either or both sides leaving the rails, the dropping of the wheels upon the ties will cause one or both of the shoes 21 to come in contact with the rails and be thereby thrown upwardly against the resistance of the springs 28 and oscillate one or both of the shafts 31 and thereby open the valve 33 and release and set all the brakes on the train.

The shoes 21 are of sufficient length to span the ball or tread of the rail and extend for a considerable distance at each side, so that the truck may sway laterally to a relatively great extent without danger of the shoes failing to be engaged by the rails in event of derailment.

In event of violent lurching of the trucks at the time of the derailment, the standards 17 and other parts are liable to be broken, and to prevent such breakage from interfering with the operation of the shoes and the setting of the air brakes, the standards are weakened by the groove 19 and the rod 20 jointed at 23. By this means the breakage of the standard will not cause failure of the operation, as the presence of the joint 23 will not prevent the rod 20 from functioning properly by the lateral displacement of the member 17 and its attachments.

The springs 28 are much stronger than the springs 39, consequently the shafts 31 will be held in position by the force of the stronger springs 28 to maintain the valve 33 closed against the resistance of the weaker springs 39, and then when either or both of the shoes are elevated by contact with the rails 15, the spring 28 will be compressed and the valve 33 opened against the resistance of the weaker spring 39 which is located for the time being nearest to the shoe 21 which is displaced and thus set the air brakes.

This release of the springs 39 and the consequent setting of the air brakes will occur whether the shoes are moved by contact with the rails, or released by the breakage of the hanger 17 as before noted.

The air brake setting devices will be caused to operate no matter under what circumstances the trucks are derailed, or whether the wheels at one or both sides are derailed. For instance it sometimes happens that one rail only "spreads," and in this case the wheels at one side only are derailed, but the air brakes will be set just the same under those circumstances, or if one or both of the standards 17 be broken without derailing the trucks.

The improved device can be readily adjusted to fit trucks of various sizes and forms without material structural change.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

1. An attachment for car trucks comprising a valve associated with the air brake mechanism, relatively weak yieldable means for holding the valve closed, and relatively strong yieldable means operating to supplement the holding means of the valve, said stronger holding means adapted to be actuated by the displacement of said truck.

2. A device of the class described comprising a valve casing adapted to be attached to a car truck and in communication with the air brake mechanism, a valve within the casing, an operating shaft connected to said valve, yieldable means for holding said shaft with the valve closed, a tubular standard attached to said truck and formed with a weakening groove, a jointed stem extending through said standard, means for coupling said stem to the valve operating shaft, and yieldable means for holding said stem and shoe in position to maintain the valve closed against the resistance of its yieldable holding means.

In testimony whereof, we affix our signatures hereto.

FRED P. BEVERLY.
COMER CALDWELL.